US009147329B2

(12) United States Patent
Bugg, Jr.

(10) Patent No.: US 9,147,329 B2
(45) Date of Patent: Sep. 29, 2015

(54) SENSORY MESSAGING SYSTEMS AND RELATED METHODS

(71) Applicant: Edward D. Bugg, Jr., Somerset, NJ (US)

(72) Inventor: Edward D. Bugg, Jr., Somerset, NJ (US)

(*) Notice: Subject to any disclaimer, the term of this patent is extended or adjusted under 35 U.S.C. 154(b) by 114 days.

(21) Appl. No.: 13/896,927

(22) Filed: May 17, 2013

(65) Prior Publication Data

US 2014/0340206 A1 Nov. 20, 2014

(51) Int. Cl.
| G08B 1/08 | (2006.01) |
| G08B 7/00 | (2006.01) |
| H04M 1/725 | (2006.01) |
| H04W 4/20 | (2009.01) |
| G08B 6/00 | (2006.01) |
| G06F 3/01 | (2006.01) |
| H04W 4/00 | (2009.01) |

(52) U.S. Cl.
CPC .............. *G08B 7/00* (2013.01); *H04M 1/72547* (2013.01); *H04W 4/206* (2013.01); *G06F 3/011* (2013.01); *G08B 6/00* (2013.01); *H04M 1/7253* (2013.01); *H04W 4/006* (2013.01)

(58) Field of Classification Search
CPC .................................. G08B 6/00; G08B 7/00
USPC ............ 340/573.1, 539.1, 407.1, 326, 539.11
See application file for complete search history.

(56) References Cited

U.S. PATENT DOCUMENTS

| 7,046,151 | B2 * | 5/2006 | Dundon ..................... 340/573.1 |
| 7,996,046 | B2 * | 8/2011 | Vargas et al. ................. 455/567 |
| 8,155,706 | B1 * | 4/2012 | Hurst ............................ 455/567 |
| 8,344,862 | B1 | 1/2013 | Donham |
| 2001/0053692 | A1 * | 12/2001 | Ito et al. ....................... 455/425 |
| 2004/0045038 | A1 * | 3/2004 | Duff et al. ..................... 725/133 |
| 2005/0108660 | A1 * | 5/2005 | Cheng et al. .................. 715/863 |
| 2007/0126927 | A1 * | 6/2007 | Yun et al. ...................... 348/473 |
| 2008/0274769 | A1 | 11/2008 | Linden |
| 2010/0153453 | A1 * | 6/2010 | Knowles ....................... 707/784 |
| 2010/0272421 | A1 * | 10/2010 | Liu et al. ....................... 392/403 |
| 2011/0053572 | A1 * | 3/2011 | Cook et al. ................. 455/414.2 |
| 2012/0042022 | A1 * | 2/2012 | Sheth et al. ................... 709/206 |
| 2013/0166679 | A1 * | 6/2013 | Kuwahara ..................... 709/217 |
| 2014/0035736 | A1 * | 2/2014 | Weddle et al. ............. 340/407.2 |

FOREIGN PATENT DOCUMENTS

| GB | 2416962 A | 2/2006 |
| WO | 2013023298 A1 | 2/2013 |

OTHER PUBLICATIONS http://article.wn.com/view/2013/04/27/New_Tech_Fundarware_keeping_couples_together_even_when_they_/#/related_news.

(Continued)

*Primary Examiner* — Brent Swarthout
(74) *Attorney, Agent, or Firm* — Brient Globerman, LLC (57) ABSTRACT

Sensory messaging systems, according to particular embodiments, are configured to enable users to transmit sensory messages between sensory messaging devices. In various embodiments, the system is configured to allow users to transmit messages that recipients can experience substantially without having to read any text associated with the message. Sensory messages, according to particular embodiments, may include an aroma, a spark, a vibration, a sound, a light, or a warming.

27 Claims, 5 Drawing Sheets

(56) References Cited

OTHER PUBLICATIONS

International Search Report, dated Sep. 1, 2014, from corresponding International Application No. PCT/US2014/038469.

Written Opinion of the International Searching Authority, dated Sep. 1, 2014, from corresponding International Application No. PCT/US2014/038469.

* cited by examiner

SENSORY MESSAGING SYSTEMS AND RELATED METHODS

BACKGROUND

Current users of messaging devices desire ways to communicate with one another that are simple and fast. These users also desire ways to communicate that are more discrete, more thoughtful, and more intimate. Accordingly, there is a need for improved systems and methods for enabling people to send and receive messages.

SUMMARY

A computer system, according to various embodiments, comprises at least one processor. In particular embodiments, the computer system is configured for: receiving, from a first mobile device associated with a first user, a request to send a sensory message to a second user; at least partially in response to receiving the request, transmitting the sensory message to a second mobile device associated with the second user; at least partially in response to receiving the request at the second mobile device, transmitting the sensory message to a first peripheral device associated with the second user, the first peripheral device being configured to convey the sensory message to the second user without the second user having to read any message associated with the sensory message; and at least partially in response to transmitting the sensory message to the first peripheral device, causing the first peripheral device to convey the sensory message to the second user.

A computer system, according to particular embodiments comprises at least one processor. In various embodiments, the computer system is configured for: receiving, from a first user of a first sensory messaging device, a first indication of a desire to send one or more sensory messages to a second sensory messaging device associated with a second user, the second sensory messaging device comprising one or more heating elements configured to increase a temperature of the second sensory messaging device; at least partially in response to receiving the first indication, transmitting the one or more sensory messages to the second sensory messaging device; receiving a second indication that the second sensory messaging device has received the one or more sensory messages; and at least partially in response to receiving the second indication, causing the one or more heating elements to increase the temperature of the second sensory messaging devices.

A non-transitory computer readable medium, in particular embodiments, contains computer executable instructions for receiving, from a first user of a first sensory messaging device, a first indication of a desire to send one or more sensory messages to a second sensory messaging device associated with a second user. In particular embodiments, the second sensory messaging device comprises: one or more heating elements configured to increase a temperature of the second sensory messaging device; one or more vibration elements configured to actuate a vibration of the second sensory messaging device; one or more aroma releasing elements configured to emit an aroma from the second sensory messaging device; and one or more static shock elements configured to emit a spark from the second sensory messaging device. In various embodiments, the computer readable medium further stores computer executable instructions for: receiving, from the second user, one or more preferences to experience sensory messages from the first user via one or more of the one or more heating elements, the one or more vibration elements, and the one or more aroma releasing elements; at least partially in response to receiving the first indication, transmitting the one or more sensory messages to the second sensory messaging device; receiving a second indication that the second sensory messaging device has received the one or more sensory messages; and at least partially in response to receiving the second indication, conveying the one or more sensory messages to the second user using the second sensory messaging device based at least in part on the one or more preferences.

BRIEF DESCRIPTION OF THE DRAWINGS

Various embodiments of a computer system for providing communication between users of a shared file system are described below. In the course of this description, reference will be made to the accompanying drawings, which are not necessarily drawn to scale, and wherein.

DETAILED DESCRIPTION OF VARIOUS EMBODIMENTS

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Systems and method according to various embodiments are configured to enable users to send and receive sensory messages. In various embodiments, sensory messages may include messages other than text messages (e.g., non-verbal messages such as touch messages, smell messages, sight messages, and sound messages that do not require the recipient to read the message to substantially understand the message). In particular embodiments, a person wishing to send a sensory message may use a suitable mobile device (e.g., such as a smartphone, tablet computer, or sensory messaging device) or a desktop computer to request to send a sensory message to a second user. At least partially in response to receiving the request, the system, in various embodiments, is configured to transmit the sensory message to a second sensory messaging device associated with the second user. In particular embodiments, the system is then configured to convey the sensory message to the second user using the second sensory messaging device.

In various embodiments, the system is configured to convey the sensory message in a variety of ways. For example, the system may be configured to cause the second sensory messaging device to vibrate, to increase in temperature, to play a sound, to light up, to emit an aroma, to cause a spark or shock, etc. Sensory messaging devices may include any suitable sensory messaging devices such as, for example: jewelry, clothing, or other accessories adapted to be worn by a user; toys, decorations, and other objects adapted for placement in a user's home; etc.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
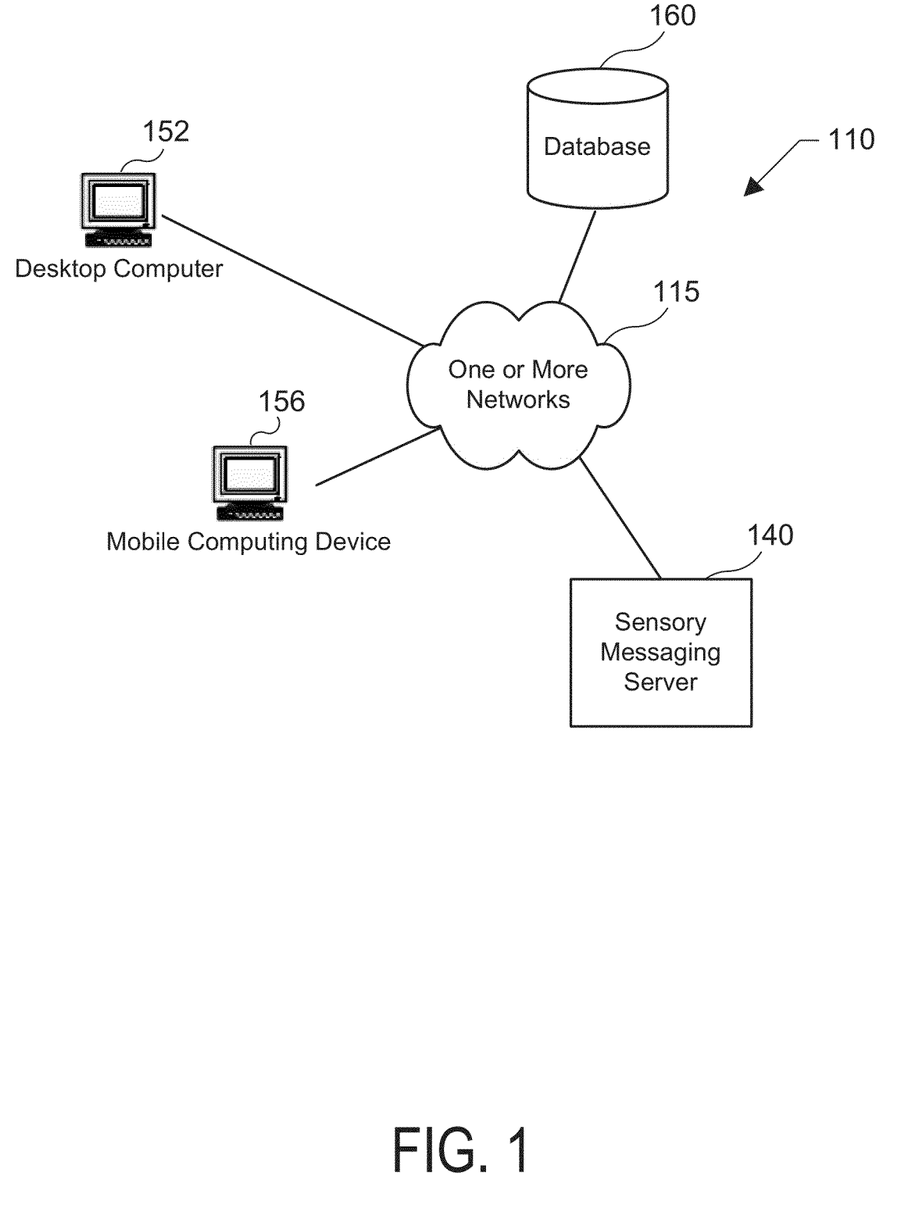
FIG. 1 is a block diagram of a Sensory Messaging System in accordance with an embodiment of the present system.

FIG. 1 is a block diagram of a Sensory Messaging System 110 according to a particular embodiment. As may be understood from this figure, the Sensory Messaging System 110 includes one or more computer networks 115, a Sensory Messaging Server 140 (which, for example, may be used to facilitate sensory message transfer between users), a Database 160 (which, for example, may be used to store communications) and one or more remote computing devices such as a desktop computer 152 or a mobile computing device 156 (e.g., such as a smart phone, tablet computer, laptop, or other mobile computing device). In particular embodiments, the one or more computer networks facilitate communication between Sensory Messaging Server 140, Database 160, and the one or more remote computing devices 152, 156.

The one or more computer networks 115 may include any of a variety of types of wired or wireless computer networks such as the Internet, a private intranet, a public switch telephone network (PSTN), or any other type of network. The communication link between the Sensory Messaging Server 140 and the Database 160 may be, for example, implemented via a Local Area Network (LAN), Wi-Fi or via the Internet.

Figure 2:
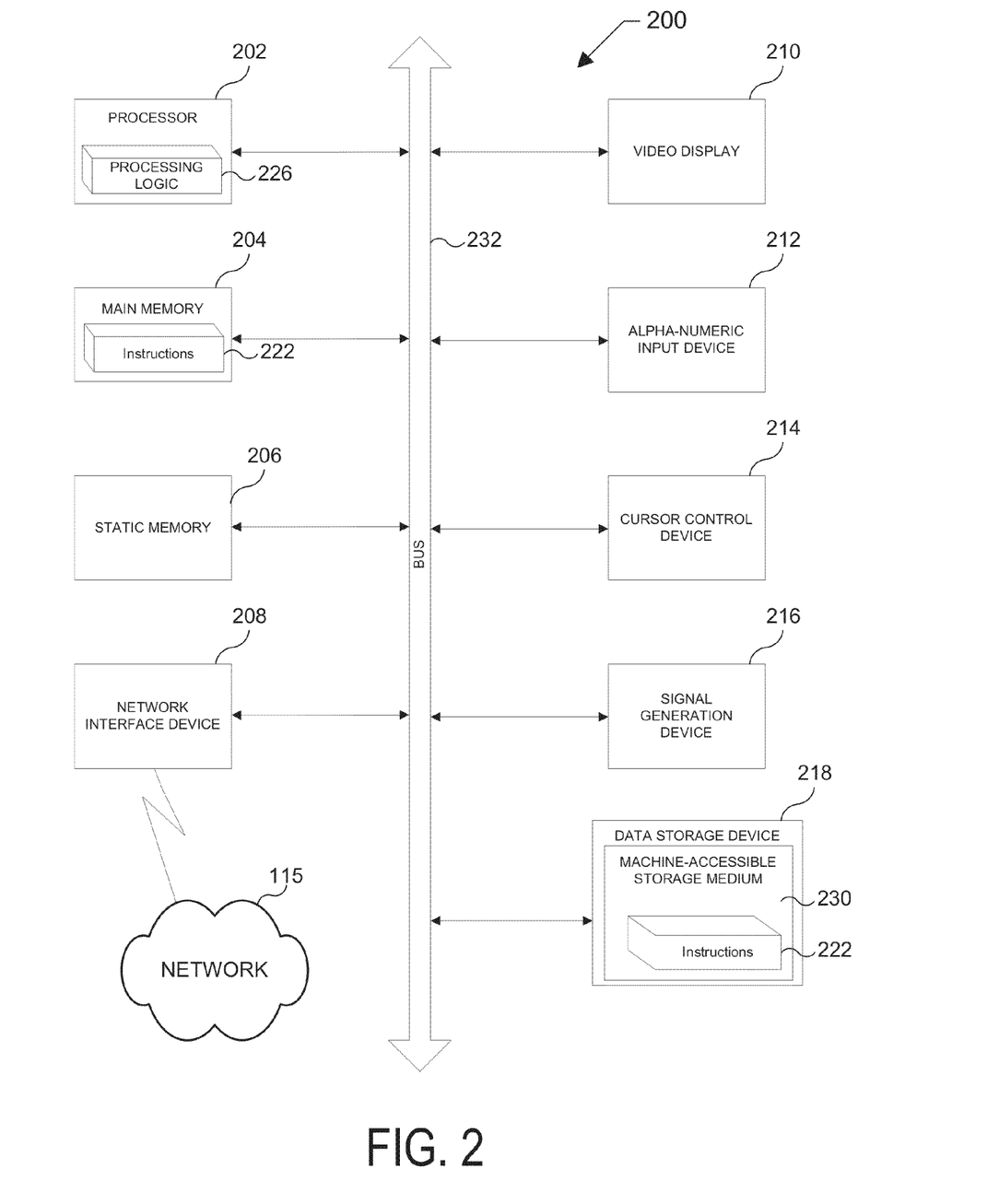
FIG. 2 is a block diagram of a Sensory Messaging Server of the Sensory Messaging System of FIG. 1.

FIG. 2 illustrates a diagrammatic representation of a computer 200 that can be used within the Sensory Messaging System 110, for example, as a client computer (e.g., one of the remote computing devices 152, 156 shown in FIG. 1), or as a server computer (e.g., the Sensory Messaging Server 140 shown in FIG. 1). In particular embodiments, the computer 200 may be suitable for use as a computer of a sensory messaging system user as these computers operate as clients within the context of the Sensory Messaging System 110 to facilitate the transfer of sensory messages between users of the sensory messaging system.

In particular embodiments, the computer 200 may be connected (e.g., networked) to other computers in a LAN, an intranet, an extranet, and/or the Internet. The computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute the processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions 222 (e.g., software) and particular system modules (e.g., such as the Sensory Messaging Module 300 in FIG. 3) embodying any one or more of the methodologies or functions described herein. The instructions 222 and Sensory Messaging Module 300 may also reside, completely or at least partially, within the main memory 204 and/or within the processing device 202 during execution thereof by the computer 200, the main memory 204 and the processing device 202 also constituting computer-accessible storage media. The instructions 222 and Sensory Messaging Module 300 may further be transmitted or received over a network 115 via the network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

Exemplary System Platform

As noted above, various aspects of the system's functionality may be executed by certain system modules, including the system's Sensory Messaging Module 300. This module is discussed in greater detail below.

Sensory Messaging Module

The Sensory Messaging Module 300 is configured to enable the transmission and conveyance of sensory messages from a first user to a second user via one or more sensory messaging devices. The Sensory Messaging Module 300 may operate alone or in combination with the Operating System 80 to perform the functions show in FIG. 3. It should be understood by one skilled in the art that certain embodiments of a Sensory Messaging Module 300 may perform the functions shown in FIG. 3 in an order other than the order shown in FIG. 3. It should also be understood that various systems, when executing a Sensory Messaging Module 300 may omit particular functions or perform additional functions in performing the functions of the Sensory Messaging Module 300.

Figure 3:
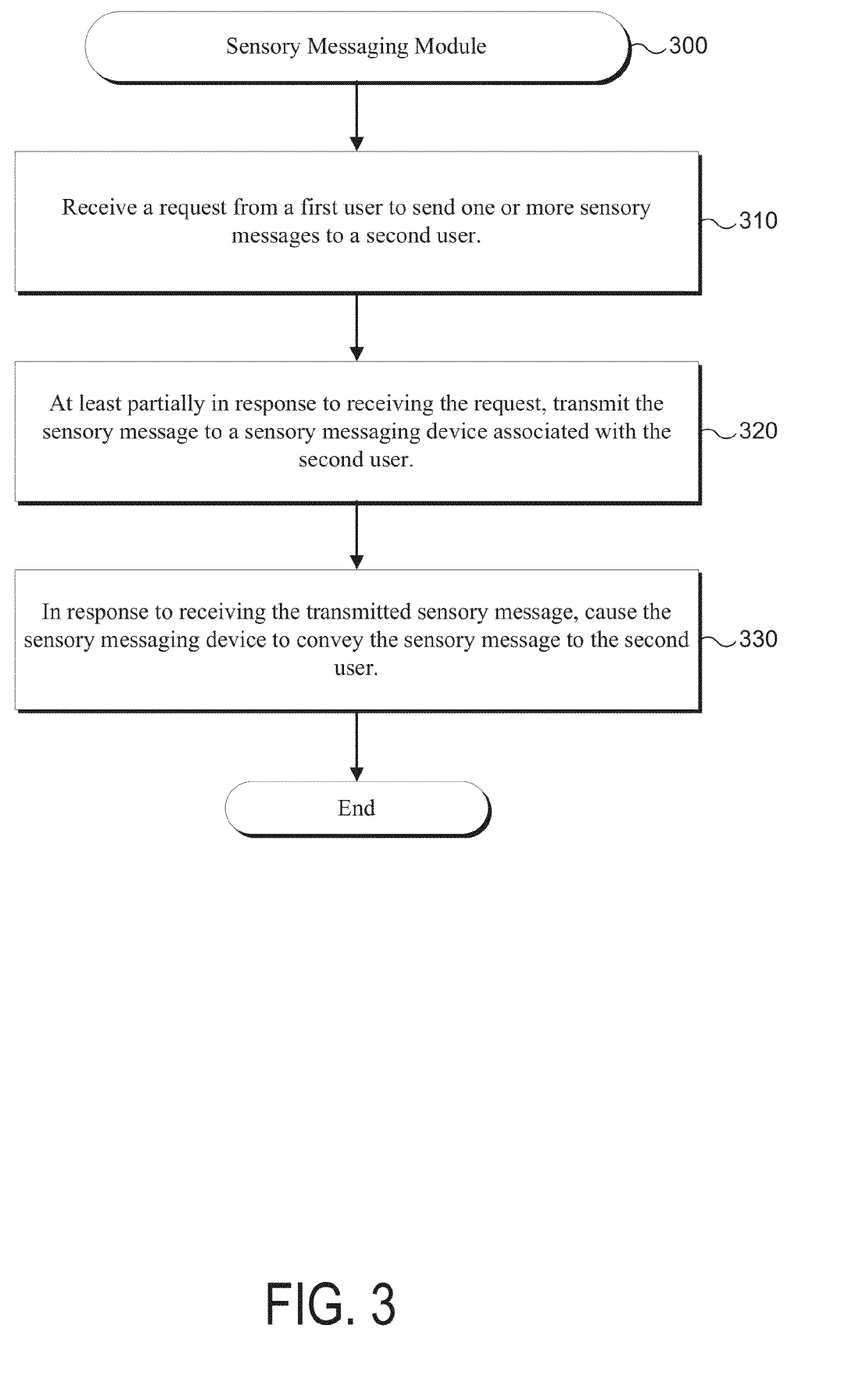
FIG. 3 depicts a flow chart that generally illustrates various steps executed by a sensory messaging module for transmitting and conveying sensory messages from one user to another.

Beginning at Step 310, the system receives a request from a first user to send one or more sensory messages to a second user. In various embodiments, the system is configured to receive the request via input by the first user received at a mobile device associated with the first user. The mobile device may be any suitable mobile device such as a smartphone, tablet, laptop, etc. In particular embodiments, the first user may enter the request via an application stored on the mobile device that is configured for sending sensory messages. In other embodiments, the system may be configured to receive the request via input by a user on a desktop computer (e.g., in response to a user entering a request to send a sensory message to the second user via a web application using the desktop computer).

In other embodiments, the request may be received at least partially in response to a request received from a sensory messaging device associated with the first user. The sensory messaging device may be any suitable sensory messaging device such as any of the sensory messaging devices described more fully below (e.g., such as a piece of jewelry, a clothing accessory, peripheral sensory messaging device, etc.). The system may be configured to receive the request in response to activation, by the first user, of a sensory message sending mechanism associated with a sensory messaging device. The sensory message sending mechanism may include any suitable sensory message sending mechanism, such as, for example, a button or switch. In other embodiments, the sensory message sending mechanism may include a pressure sensor that is configured to interpret pressure applied by the first user (e.g., by touching, squeezing, etc. against the pressure sensor) on the sensory message sending mechanism as a request to send a sensory message. In still other embodiments, the sensory message sending mechanism may comprise a temperature sensing mechanism that is configured to interpret a change in temperature as a request to send a sensory message. The change in temperature may, for example, be provided by contact from the first user's skin, by the first user's breath (e.g., by blowing on the sensory message sending mechanism), or in any other suitable manner. In other embodiments the system is configured to receive the request at the sensory messaging device by any other suitable sensory message sending mechanism.

In particular embodiments, the request to send the one or more sensory messages to the second user comprises a request to send one or more sensory messages to a second sensory messaging device associated with the second user. In particular embodiments, the second sensory messaging device may include any suitable sensory messaging devices, such as the sensory messaging devices described more fully below.

In various embodiments, the one or more sensory messages that the system receives the request to send may include any suitable sensory messages. Sensory messages, in various embodiments, may include a vibration, spark, aroma, temperature change, light, color change, sound, etc. In particular embodiments, sensory messages may include any combinations of these various sensory messages. In other embodiments, the requested one or more sensory messages may include an intensity, duration, frequency, or other direction for conveying the sensory message. For example, a sensory message that includes warmth may also include a direction that the sensory messaging device associated with the second user increases in temperature for one second, returns to a normal temperature (e.g., skin temperature) for one second, and repeats this cycle for a total of thirty seconds, or until canceled. As may be understood by one skilled in the art, a sensory message may include any suitable combination of features described above (e.g., any suitable combination of sensory message conveyance methods at any suitable duration, pressure, time, etc.).

Returning to Step 320, the system continues by, at least partially in response to receiving the request from the first user at Step 310, transmitting the sensory message to a sensory messaging device associated with the second user. In various embodiments, the system is configured to transmit the sensory message wirelessly (e.g., via a cellular network, Bluetooth, WI-FI, etc.). In particular embodiments, the system is configured to transmit the sensory message to a mobile device associated with the second user (e.g., such as the second user's smart phone) in a first wireless manner and then transmit the sensory message from the mobile device to the sensory messaging device in a second wireless manner. In a particular embodiment, the first wireless manner is via a cellular network, and the second wireless manner is via a Bluetooth connection between the mobile device and the sensory messaging device. In other embodiments, the system may be configured to transmit the sensory message in any other suitable manner. In particular embodiments, the system may be configured to transmit the sensory message from the device (e.g., mobile device, sensory messaging device, etc.) from which the system received the request to send the sensory message from the first user.

At Step 330, the system continues by, at least partially in response to receiving the transmitted sensory message, causing the sensory messaging device to convey the sensory message to the second user. In various embodiments, the system may cause the sensory messaging device to convey the sensory message by causing activation of a sensory message-conveying component of the sensory messaging device. Various sensory message-conveying components are described more fully below.

Sensory Message-Conveying Components

Various sensory messaging devices may include one or more sensory message-conveying components. Particular embodiments of sensory message-conveying components include vibrational components, temperature changing components, aroma emitting components, light emitting components, sound emitting components, and shock emitting components. It should be understood by one skilled in the art that a particular sensory messaging device may include any combination of these sensory message conveying components. These exemplary components are described below.

Vibrational Components

Particular embodiments of a sensory messaging conveying component include one or more vibrational components. In particular embodiments, the one or more vibrational components include any suitable vibration mechanism configured to convey a sensory message by causing a vibration in the sensory messaging device. In various embodiments, the vibration mechanism may include any suitable combination of motors or other components suitable for causing a vibration. Vibrational variables, in various embodiments, include intensity, frequency, duration, pulse, and amplitude. In other embodiments, vibrational variables may include any pattern or combination of these variables (e.g., user-defined combinations).

Temperature Changing Components

In various embodiments, sensory messaging conveying components include temperature changing components, which may, for example, include one or more temperature changing mechanisms configured to cause a change in temperature of at least a portion of the sensory messaging device. In particular embodiments, these changes in temperature may include an increase in temperature (e.g., to cause a warming of the sensory messaging device), a decrease in temperature (e.g., to cause a cooling of the sensor messaging device), or both. In various embodiments, the one or more temperature changing mechanisms may include any suitable resistor (e.g., such as a light bulb) or light, and a power source, or any other suitable mechanism for enabling an increase or decrease in temperature.

Aroma Emitting Components

In various embodiments, sensory messaging conveying components include aroma emitting components, which may, for example, include one or more temperature changing mechanisms in combination with any suitable heat-activated scented coating or oil. In particular embodiments, the aroma emitting components are configured to emit an aroma to convey a sensory message by causing an increase in the temperature of the heat-activated scented coating (e.g., using any suitable temperature changing mechanism). In particular embodiments, aroma emitting components may be configured to allow a user to reapply heat-activated scented coatings with different scents, or reapply the scented coatings once a supply of scented coating stored as part of the aroma emitting components has been at least mostly exhausted (e.g., fully exhausted). In other embodiments, an aroma emitting component may include one or more reservoirs containing one or more scented oils. In particular embodiments, aroma emitting components may emit one or more aromas in any other suitable way (e.g., as a perfume spray, atomizer, etc.).

Light Emitting Components

In particular embodiments, sensory message conveying components include one or more lighting mechanisms configured to convey a sensory message by displaying light in one or more particular changing colors, patterns, etc. In various embodiments, lighting mechanisms may include any suitable source of lighting (e.g., fluorescent bulbs, Light-emitting diodes (LEDs), etc.). In particular embodiments, lighting mechanisms may be configured to emit visible light, ultraviolet light, infrared light, changing colored lights, or any other suitable light (e.g., such as black light).

Sound Emitting Components

In particular embodiments, sensory message conveying components include one or more sound emitting mechanisms configured to convey a sensory message by playing one or more sounds. Sound emitting mechanisms may include, for example, one or more speakers or any other suitable sounds emitting mechanism. In various embodiments, the one or more sounds that convey the sensory message may include any suitable sound (e.g., a recording, a chime, a chirp, a series of sounds, MP3 file, etc.).

Shock Emitting Components

In various embodiments, sensory message conveying components include one or more shock emitting components configured to cause the second user to experience a shock (e.g., a mild shock). In particular embodiments, the shock emitting component is configured to cause a shock that is substantially pain free (e.g., causes no discomfort to a user experiencing the shock) for the second user. Shock emitting components may include any suitable combination of electrodes and one or more power sources (e.g., batteries). In various embodiments, a shock emitting component may be configured to cause a static shock (e.g. spark).

Exemplary Sensory Messaging Devices

In addition to various sensory message-conveying components that have been described in this disclosure above, a sensory messaging device may be embodied in any suitable manner. For example, sensory messaging devices may include computers (e.g. pads, tablets, cell phones), jewelry, clothing and accessories, and other peripheral devices.

Jewelry

In particular embodiments, sensory messaging devices may be embodied as pieces of jewelry, or other objects that are designed to be worn by a user. This may include, for example, watches, rings, necklaces, bracelets, anklets, pendants, medallions, eye glasses, etc.

Clothing and Accessories

In various embodiments, sensory messaging devices are embodied as clothing and/or clothing accessories. In particular embodiments, sensory messaging devices may include shirts, jackets, sweaters, sweatshirts, pants, shorts, dresses, skirts, broaches, belts, belt buckles, pocketbooks, wallets, purses, shoes, etc.

Peripheral Devices

In particular embodiments, sensory messaging devices may include any other suitable peripheral devices or objects which may be suitable for conveyance of sensory messages. These peripheral devices include, for example, picture frames, lamps, mirrors, clocks, seasonal decorations, toys, stuffed animals, greeting cards, etc.

Modular Sensory Messaging Devices (e.g., Sensory Messaging Inserts)

In particular embodiments, sensory messaging devices may include a modular sensory messaging device (e.g., a sensory messaging insert). In particular embodiments, the sensory messaging insert may comprise one or more of the sensory message conveying components described above. In various embodiments, the sensory messaging insert may be configured to enable a user to removeably attach the sensory messaging insert to a sensory messaging device (e.g., such as any of the sensory messaging devices described above). Users may removeably attach the sensory messaging inserts in any suitable way such as, for example, with clips, by inserting the sensory messaging insert into a corresponding slot for the insert on a sensory messaging device, etc.

In such embodiments, the system may be configured to allow users to switch out sensory messaging inserts in order to change the sensory message conveying mechanism in a particular sensory messaging device (e.g., and thus change the manner in which sensory messages are conveyed to that user via that sensory messaging device). For example, a user may switch out an 'aroma' module in their necklace with a 'warmth' module. A user may also, for example, transfer a sensory messaging insert between sensory messaging devices (e.g., if they are wearing a watch today rather than a necklace, the user may transfer the sensory messaging insert from the necklace to the watch). In such embodiments, users may still be able to receive sensory messages, without having to wear or carry the same sensory messaging device all the time.

In particular embodiments, the system may enable the user to utilize the sensory messaging device as a standalone sensory message receiving device (e.g., substantially without having to removeably attach the insert to another object or device. For example, a user may place the sensory messaging insert into a pocket (e.g., such as their shirt pocket) or in any other suitable location such that the user may still experience sensory messages from the insert without selectively attaching the insert to another device.

In particular embodiments, the sensory messaging insert is sufficiently small to enable a user to insert it into small devices (e.g., watches, jewelry etc.) substantially without increasing the bulk of the small device (e.g., such that the sensory messaging insert would not be visibly noticeable when removeably attached or inserted into to the device). In various embodiments, the sensory messaging insert may be substantially disc-shaped, substantially pod-shaped, or embodied in any other suitable housing (e.g., a housing that enables a user to easily transfer the insert between devices).

Exemplary User Experience

Figure 4:
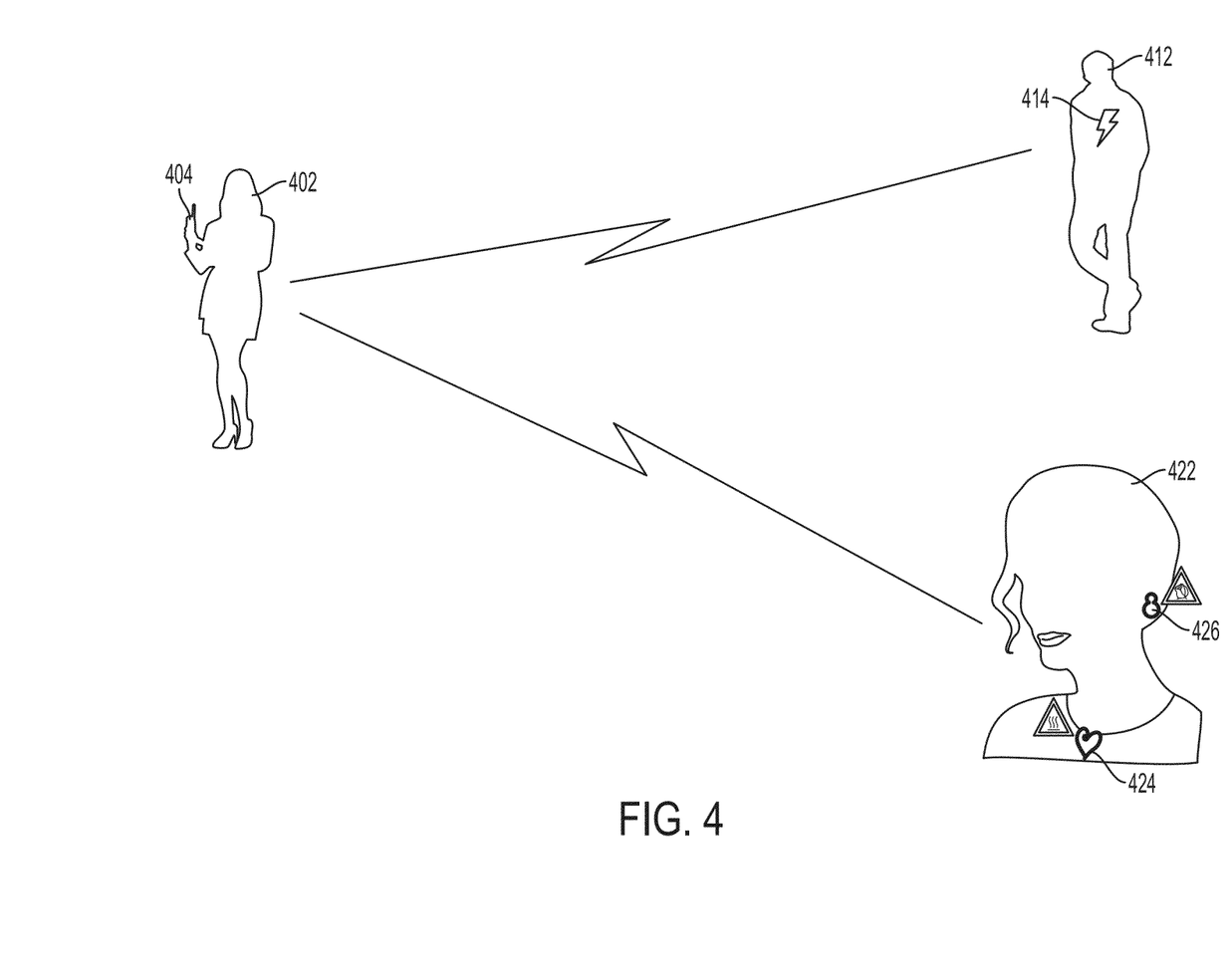
FIG. 4 is a diagrammatic representation of the conveyance of a sensory message.

FIG. 4 illustrates an exemplary transmission of sensory messages form a first user 402 to one or more other users 412, 422. As may be understood from this figure, the first user 402 is using a mobile device 404 (e.g., a smartphone) to send sensory messages to a second user 412 and third user 422. In the example shown in this figure, the first user 412 has sent a spark message 414 to the second user 412. In response to the request to send the spark message 414 by the first user 402, the system has wirelessly transmitted the spark message 414 to the second user 412 and conveyed the spark message 414 to the second user 412 by causing the second user's sensory messaging device (e.g., a bracelet or watch) to spark.

Similarly, the first user 402 has transmitted warmth 426 and aroma 424 messages to the third user 422 using her mobile device 404. As may be understood from this figure, in response to receiving the first user's request to send warmth 426 and aroma 424 sensory messages, the system has caused the third user's earrings to emit an aroma 424 and caused the third user's necklace pendant to increase in temperature.

Figure 5:
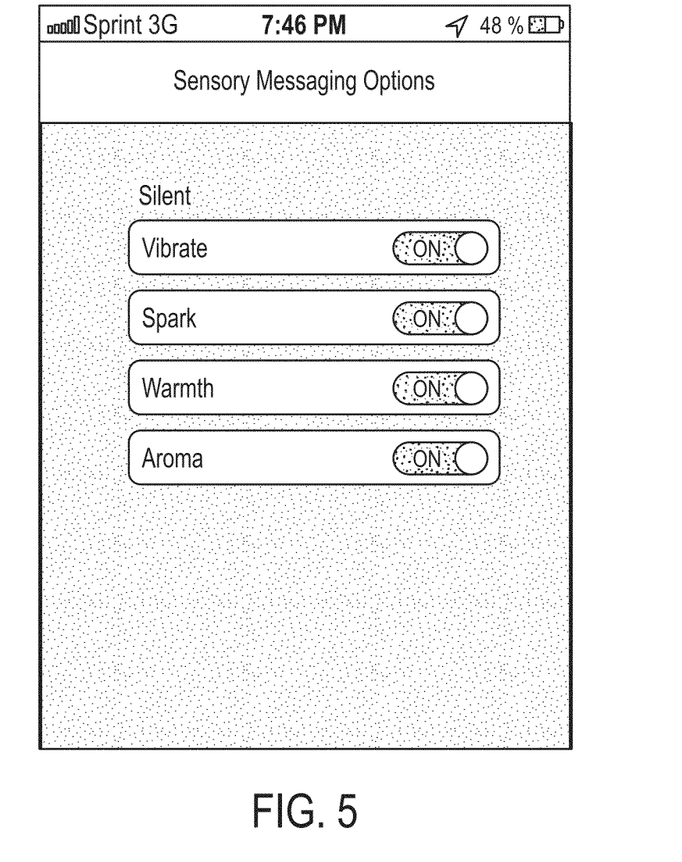
FIG. 5 is a screen display of a sensory messaging system for selecting a particular type of sensory message.

FIG. 5 depicts an exemplary screen display 500 from which a user (e.g., a recipient of sensory messages or a sender of sensory messages) may select a type of sensory message that the user would like to send. This screen display shows how a user may experience the sensory messaging system on a mobile device, tablet computer, or any other suitable device from which a user may send a sensory message. As may be understood from this figure, users may choose to toggle between on and off selections for sensory message conveyance methods including vibrate 502, spark 504, warmth, 506, and aroma, 508.

Exemplary Uses

Exemplary applications of sensory message transmission are described below. As will be understood by one skilled in the art, these examples are for illustrative purposes and demonstrate particular examples of various embodiments of the systems described in this disclosure.

As a particular example, during a long, stressful workday, a husband may receive a short spark on his watch from his wife reminding him what really matters, that she loves him, and that she is waiting for him at home. The wife may have, for example, sent the short spark via an application on her mobile phone (e.g., her iPhone). In another particular example, a student may be taking a difficult final exam at school, during which she may detect a soft fragrance of lilac on her bracelet sent by her mother as a sensory message. The fragrance may remind the student of her mother's confidence and love, regardless of the outcome of the exam.

In another illustrative example, after four loads of laundry, car trips to the pre-school and grocery store, two walks with the dog, and one lost shoe, a stay-at-home mom regularly gets a series of short pulse vibrations simulating a heartbeat pattern as a sensory message on her necklace locket from her husband. The sensory message may remind her of how much her husband appreciates how much she does for the family. In yet another illustrative example, before going to sleep, a young boy's favorite stuffed animal may "snuggle" (e.g., vibrate) and play a lullaby sent from his Dad's tablet computer (e.g., such as an iPad) from an overseas military base where he serves. This "good night" sensory message may remind the young boy how much his Dad loves and misses him.

As another particular example, a teenage girl uses her sensory messaging bracelet to send a sensory message comprising a warming pulse to the back of her boyfriend's wristwatch. In another example, an elderly woman living in a retirement home may proudly watch a framed picture of her grandchildren light up and play a chimed melody whenever one of them thinks of her and sends a sensory message from their computer.

As another particular example, a man celebrating Christmas purchases decorations designed to send sensory messages (e.g. flashing lights, sounds, etc.) when friends send him "season's greetings" and he is within a distance to see and hear them.

Alternative Embodiments

Various embodiments of a sensory messaging system may include features in addition to or in place of the various features described above. Various alternative embodiments are described below.

Recipient Determined Sensory Message Type

In various embodiments, the system is configured to enable users to assign preferences for receiving sensory messages. In particular embodiments, these preferences include preferences for how the user would like sensory messages that the user receives to be conveyed. For example, users that don't enjoy the feeling of warmth may elect to assign a preference for a shock or spark sensory message. In various embodiments, the system may be configured to allow users to assign preferences for a particular type of sensory message conveyance based on the person from whom the user receives the sensory message. For example, the system may enable the user to configure their preferences such that a sensory message received from their mother is conveyed in a first manner (e.g., via a light and an aroma) and a sensory message conveyed from their girlfriend is conveyed in another (e.g., via warmth and a sound). In such embodiments, users may be able to determine the source of a sensory message substantially without having to look or read who sent the sensory message.

Proximity Settings

In various embodiments, a sensory messaging system may be configured to substantially automatically send a sensory message from one user to another via one or more sensory messaging devices, for example, in response to determining that the users are within a particular distance of one another. For example, a wife may set a sensory messaging device to substantially automatically send her a particular sensory message in response to determining that her husband is within five miles of their home (e.g., is on his way home from work). In other embodiments, the sensory messaging system may be configured to send or receive sensory messages based on any other geographic or proximity factor (e.g., such as sending a sensory message to a parent when their child safely reaches an event such as a concert).

In various embodiments, in response to receiving a request to send a sensory message to a particular user, the system may be further configured to determine whether the particular user is within a particular distance of an associated sensory messaging device (e.g., a sensory message conveying device) before conveying the sensory message to the particular user. For example, in response to determining that a particular user is more than a certain number of feet from an associated sensory message conveying device (e.g., 2 feet, 5 feet, 10 feet or any other suitable distance), the system may be configured not to convey the sensory message. In various embodiments, the distance may be provided by the sensory message sender or recipient as a preference to the system. In particular embodiments, the system may be configured to wait to convey the sensory message until the system determines that the particular user is within the certain number of feet of the device (e.g., to ensure that sensory messages are received only when the user can see, smell, feel, hear or otherwise experience the stimuli delivered by the sensory messaging device). In other embodiments, the system may not deliver or convey a sensory message at all in response to determining that the recipient is more than a particular distance from their sensory messaging device.

In particular embodiments, such as embodiments in which a sensory message is sent to a mobile device of a sensory message recipient (e.g., such as a smartphone) and then conveyed wirelessly to a peripheral sensory messaging device associated with the recipient (e.g., such as a watch or any other suitable sensory message conveying device described above), the system is configured to determine if the sensory message recipient is within a particular distance of a sensory message conveying device by determining a distance between the user's mobile device (e.g., a smartphone that the user may, for example, carry with them) and the peripheral sensory message conveying device (which may, for example, be located in their home, office, or a location other than on their person). The system may be configured to determine the distance in any suitable manner (e.g., via GPS, etc.).

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that the modifications and other embodiments are intended to be included within the scope of the appended exemplary concepts. Although specific terms are employed herein, they are used in a generic and descriptive sense only and not for the purposes of limitation.

What is claimed is:

1. A computer system comprising: at least one processor, wherein the computer system is configured for:
   (A) receiving, from a first mobile device associated with a first user, a request to send an underlying message to a second user;
   (B) at least partially in response to receiving the request, transmitting the underlying message to a second mobile device associated with the second user;
   (C) at least partially in response to receiving the underlying message at the second mobile device, coordinating the delivery of the underlying message to the second user via a peripheral device associated with the second user, wherein the peripheral device is configured to convey the underlying message to the second user by generating at least one sensory stimulus that is selected from a group consisting of:
   (1) vibration;
   (2) light;
   (3) sound;
   (4) aroma;
   (5) spark;
   (6) temperature change; and
   (7) color change, wherein the computer system is further configured for receiving the request in response to activation, by the first user, of an underlying message sending mechanism associated with an underlying messaging device, wherein the underlying message sending mechanism comprises a temperature sensing mechanism that is configured for receiving the first user's breath.

2. The computer system of claim 1, wherein the peripheral device is configured to convey the underlying message to the second user by generating at least two sensory stimuli that are selected from a group consisting of:
   (1) vibration;
   (2) light;
   (3) sound;

(4) aroma;
(5) spark;
(6) temperature change; and
(7) color change.

3. The computer system of claim 1, wherein the peripheral device is configured to:
 convey the underlying message to the second user without the second user having to read any message associated with the underlying message; and
 at least partially in response to coordinating the delivery of the underlying message to the second user via the peripheral device associated with the second user, causing the peripheral device to convey the underlying message to the second user.

4. The computer system of claim 1, wherein the computer system is adapted to allow the second user to configure one or more second user preferences so that: (1) a first underlying message received from a first user is conveyed in a first manner, and (2) a second underlying message received from a second user is conveyed in a second manner.

5. The computer system of claim 4, wherein the first manner is different from the second manner.

6. The computer system of claim 4, wherein conveying the first underlying message in the first manner comprises generating at least one sensory stimulus that is selected from a group consisting of:
(1) vibration;
(2) light;
(3) sound;
(4) aroma;
(5) spark;
(6) temperature change; and
(7) color change.

7. The computer system of claim 6, wherein conveying the first underlying message in the first manner comprises generating at least two sensory stimuli that are selected from a group consisting of:
(1) vibration;
(2) light;
(3) sound;
(4) aroma;
(5) spark;
(6) temperature change; and
(7) color change.

8. The computer system of claim 7, wherein the at least two sensory stimuli comprise at least a light and a particular aroma.

9. The computer system of claim 7, wherein the at least two stimuli comprise at least warmth and a particular sound.

10. The computer system of claim 7, wherein:
 the first underlying message is a "Season's Greetings" message sent from the first user; and
 the first manner comprises generating flashing lights and one or more sounds.

11. The computer system of claim 4, wherein conveying the second underlying message in the second manner comprises generating at least one sensory stimulus that is selected from a group consisting of:
(1) vibration;
(2) light;
(3) sound;
(4) aroma;
(5) spark;
(6) temperature change; and
(7) color change.

12. The computer system of claim 11, wherein conveying the second underlying message in the second manner comprises generating at least two sensory stimuli that are selected from a group consisting of:
(1) vibration;
(2) light;
(3) sound;
(4) aroma;
(5) spark;
(6) temperature change; and
(7) color change.

13. The computer system of claim 1, wherein a particular underlying message includes a predetermined cycle of temperature changes that occur over time.

14. The computer system of claim 1, wherein the peripheral device comprises one or more sensory messaging modules, wherein the one or more sensory messaging modules are configured to enable a user to removably attach the one or more sensory messaging modules to the peripheral device.

15. The computer system of claim 1, wherein:
 the underlying message comprises one or more sparks;
 the peripheral device comprises one or more shock producing elements configured to emit one or more sparks from the peripheral device; and
 causing the peripheral device to convey the underlying message to the second user by generating at least one sensory stimulus comprises causing the one or more shock producing elements to emit the one or more sparks.

16. A computer system comprising: at least one processor, wherein the computer system is configured for:
 (A) receiving, from a first mobile device associated with a first user, a request to send an underlying message to a second user, wherein receiving the request is done in response to activation, by the first user, of an underlying message sending mechanism associated with an underlying messaging device, and the underlying message sending mechanism comprises a temperature sensing mechanism that is configured for receiving the first user's breath;
 (B) at least partially in response to receiving the request, transmitting the underlying message to a second mobile device associated with the second user;
 (C) at least partially in response to receiving the request underlying message at the second mobile device, coordinating the delivery of the underlying message to the second user via a peripheral device associated with the second user, wherein the peripheral device is configured to convey the underlying message to the second user by generating a specified series of vibrations.

17. The computer system of claim 16, wherein the specified series of vibrations is a series of short pulse vibrations.

18. The computer system of claim 16, wherein the series of short pulse vibrations simulates a heartbeat pattern.

19. The computer system of claim 16, wherein the underlying message includes an instruction on how to convey the underlying message, wherein the instruction on how to convey the underlying message includes duration instructions and/or frequency instructions for the underlying message.

20. The computer system of claim 16, wherein the peripheral device associated with the second user is a stuffed animal.

21. The computer system of claim 20, wherein:
 the underlying message is a "Good Night" message sent from the first user; and
 the peripheral device is configured to convey the underlying message to the second user by vibrating the stuffed animal and playing a particular song.

22. The computer system of claim 16, wherein the underlying message is not transmitted to a second mobile device associated with the second user if the user is out of range of the second mobile device.

23. The computer system of claim 16, coordinating the delivery of the underlying message to the second user via a peripheral device associated with the second user comprises the second mobile device communicating wirelessly with the peripheral device.

24. The computer system of claim 16, wherein the peripheral device is selected from a group consisting of:
 (1) a piece of jewelry;
 (2) a stuffed animal; and
 (3) an article of clothing.

25. A non-transitory computer-readable medium storing computer executable instructions for:
 (A) receiving, from a first mobile device associated with a first user, a request to send an underlying message to a second user;
 (B) at least partially in response to receiving the request, transmitting the underlying message to a second mobile device associated with the second user;
 (C) at least partially in response to receiving the underlying message at the second mobile device, coordinating the delivery of the underlying message to the second user via a peripheral device associated with the second user, wherein the peripheral device is configured to convey the underlying message to the second user by generating at least one sensory stimulus that is selected from a group consisting of:
 (1) vibration;
 (2) light;
 (3) sound;
 (4) aroma;
 (5) spark;
 (6) temperature change; and
 (7) color change, wherein the non-transitory computer-readable medium further stores computer-executable instructions for:
 receiving the request in response to activation, by the first user, of an underlying message sending mechanism associated with an underlying messaging device, wherein the underlying message sending mechanism comprises a temperature sensing mechanism that is configured for receiving the first user's breath.

26. The non-transitory computer-readable medium of claim 25, wherein the non-transitory computer-readable medium further stores computer-executable instructions for:
 allowing the second user to configure one or more second user preferences so that:
 (1) a first underlying message received from a first user is conveyed in a first manner, and
 (2) a second underlying message received from a second user is conveyed in a second manner.

27. The non-transitory computer-readable medium of claim 26, wherein the first manner differs from the second manner.

\* \* \* \* \*